United States Patent [19]

Giorgetti

[11] Patent Number: 4,613,019

[45] Date of Patent: Sep. 23, 1986

[54] DISK BRAKE ASSEMBLY

[75] Inventor: Alberto Giorgetti, Paladina, Italy

[73] Assignee: Brembo S.p.A., Paladina, Italy

[21] Appl. No.: 569,766

[22] Filed: Jan. 10, 1984

[30] Foreign Application Priority Data

Jan. 10, 1983 [IT] Italy .............................. 19048 A/83

[51] Int. Cl.[4] ............................................. F16D 55/00
[52] U.S. Cl. ............................... 188/73.31; 188/73.38; 188/73.44
[58] Field of Search ................ 188/73.44, 73.45, 71.1, 188/73.31, 73.38, 73.1, 73.2, 73.36–73.37, 73.41–73.43, 234, 370, 250 B, 73.34, 73.32

[56] References Cited

U.S. PATENT DOCUMENTS

| | | | |
|---|---|---|---|
| 3,756,353 | 9/1973 | Bombassei et al. | 188/73.44 X |
| 3,887,045 | 6/1975 | DeHoff et al. | 188/73.45 |
| 3,917,032 | 11/1975 | Hoffman et al. | 188/73.44 |
| 3,990,543 | 11/1976 | Grewette et al. | 188/71.1 |
| 4,061,209 | 12/1977 | Gee et al. | 188/73.45 X |
| 4,279,331 | 7/1981 | Lupertz | 188/73.37 X |
| 4,392,559 | 7/1983 | Oshima | 188/73.45 X |
| 4,476,962 | 10/1984 | Bofill | 188/71.1 |

FOREIGN PATENT DOCUMENTS

| | | | |
|---|---|---|---|
| 2931216 | 3/1981 | Fed. Rep. of Germany ... | 188/73.32 |
| 1161355 | 8/1969 | United Kingdom ............... | 188/71.1 |
| 2053389 | 1/1981 | United Kingdom ............... | 188/73.32 |

Primary Examiner—Bruce H. Stoner, Jr.
Assistant Examiner—Michael P. Gilday
Attorney, Agent, or Firm—Frishauf, Holtz, Goodman & Woodward

[57] ABSTRACT

A disc brake in which a caliper body (3) is movable relative to a support (2) in the direction of the axis of the disc so as to locate itself on the disc. For this purpose the disc brake includes guide means (6) between the caliper body (3) and the support (2) including a pin (16) fixed to the support about which the caliper body is rotatable as well as two stop shoulders (27, 28) provided in the support and engageable with the caliper body to retain it angularly between them. Dual purpose gudgeon pin bolts (39,42 and 40, 43) not only exert a gripping force on the caliper body but also cooperate with end hook portions (41) of the respective pads on opposite sides of the disc to retain the pads in the caliper body against drag from braking.

2 Claims, 4 Drawing Figures

DISK BRAKE ASSEMBLY

DESCRIPTION

The present invention relates to a disc brake assembly of the type comprising a brake support, a caliper body located astride a disc and provided with pads on opposite sides of the disc as well as guide means between the caliper body and brake support extending in the direction of the axis of the disc.

In disc brakes of this type the caliper body may move or "float" relative to the support in the direction of the axis of the disc so as always to be located on the disc itself during breaking, whatever mutual position the support and the disc take up during assembly, in dependence on the working tolerances, and also independently of the wear of the pads and the dimensional deviations caused by thermal expansion of various parts of the brake itself.

In order to allow the caliper body to float and locate itself in accordance with the position of the disc, guide means are provided between caliper body and the brake support. According to a known and widely used disc brake assembly the support is provided with two generally cylindrical parallel spaced apart guides along which the caliper body slides like a drawer, the caliper body being in its turn provided with bushes mating with the guides.

This solution, although advantageous from various points of view, has, however, several disadvantages which limit its efficiency. In particular, it is found that the calliper body tends to get stuck during the initial braking phase in which it should position itself freely on the disc.

The problem which is at the root of the present invention is that of devising a disc brake assembly which has structural and functional characteristics such as to satisfy the said requirement while simultaneously overcoming the disadvantages mentioned with reference to the known art.

This problem is solved by a disc brake assembly of the type specified which is characterised in that the guide means include a pin on which the caliper body is rotatably mounted and in that stop means for the caliper body are provided in the support for retaining the caliper body angularly.

Further characteristics and advantages of the disc brake assembly according to the present invention will become clearer from the following description of a preferred embodiment given purely by way of non-limiting example, with reference to the appended drawings, in which.

Figure 1:
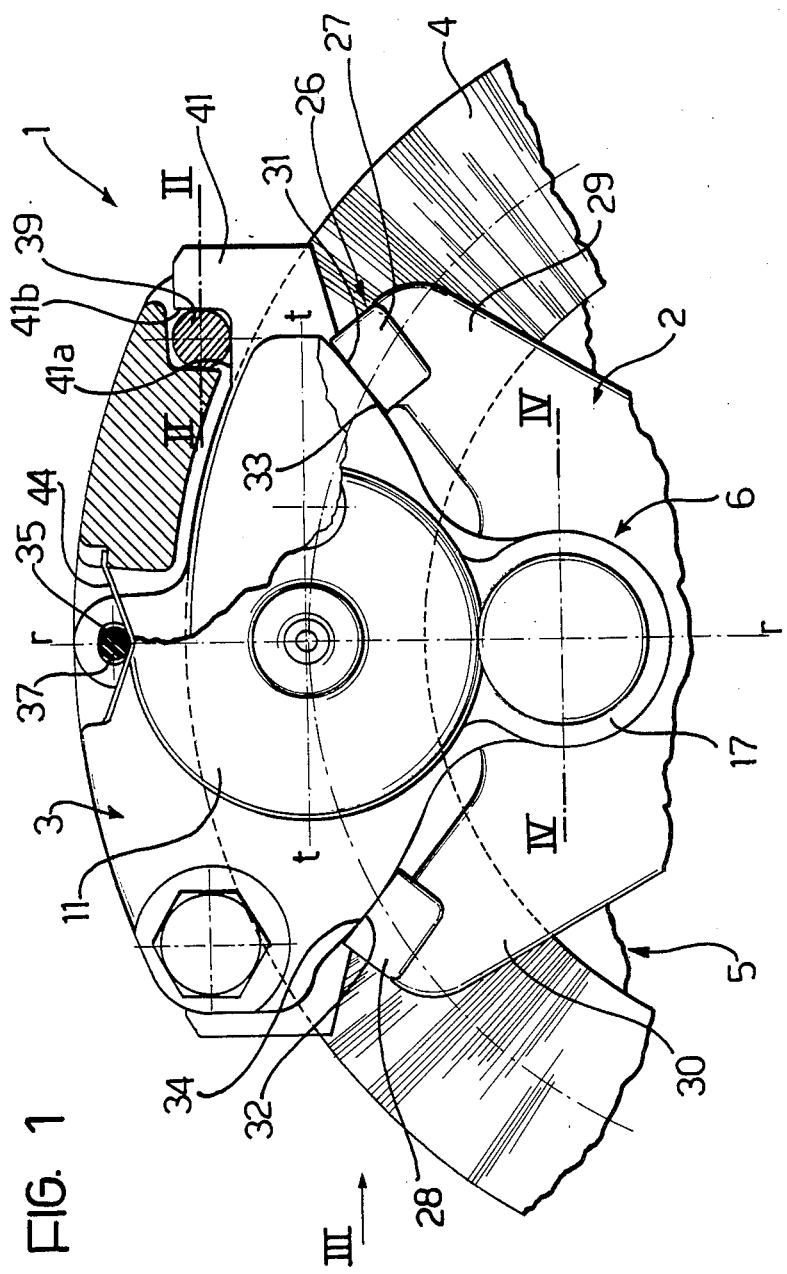
FIG. 1 is a partially sectioned side elevational view of a disc brake assembly according to the invention.
Figure 2:
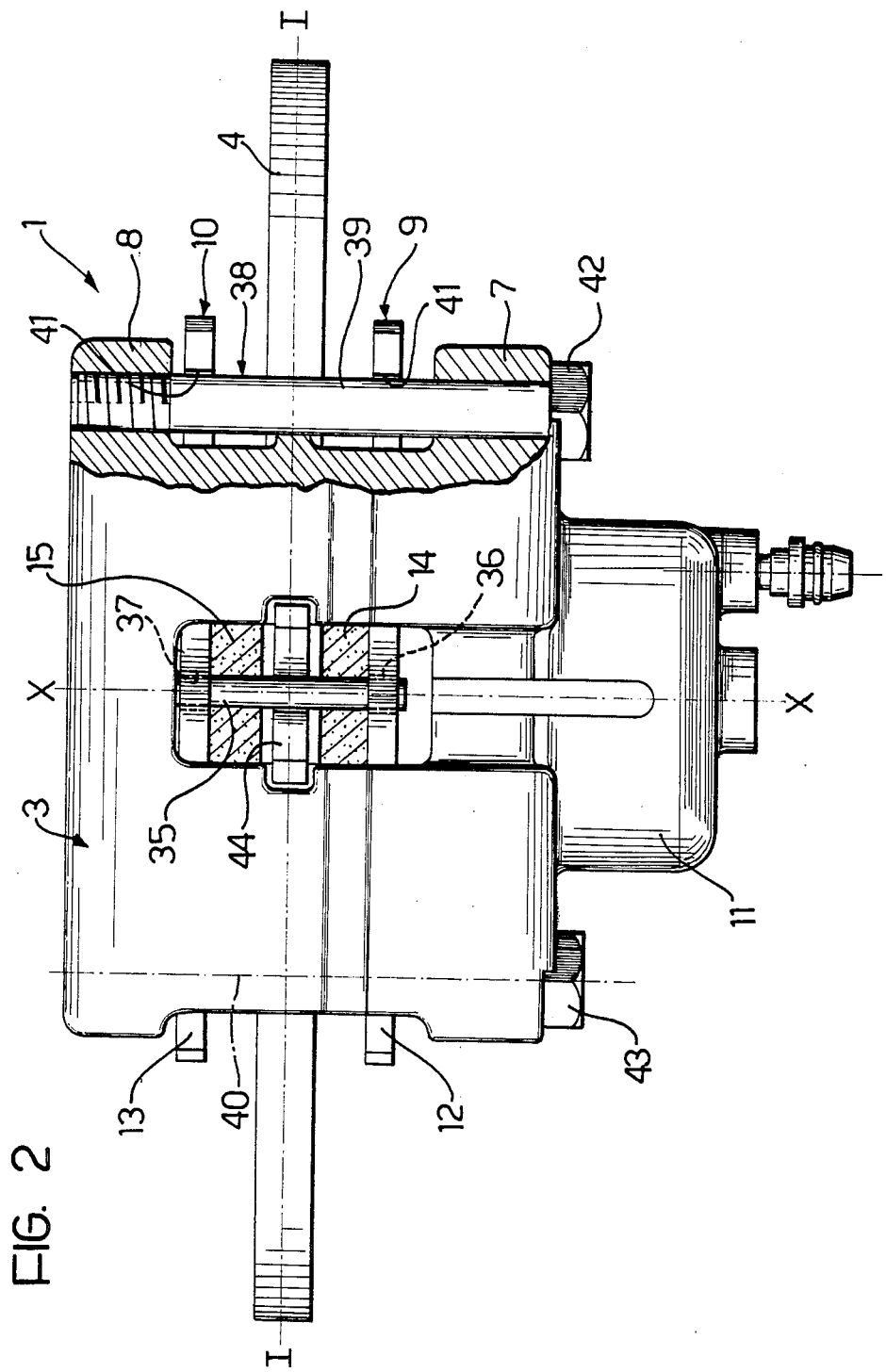
FIG. 2 is a partially sectioned view of the disc brake assembly of FIG. 1 from above.
Figure 4:
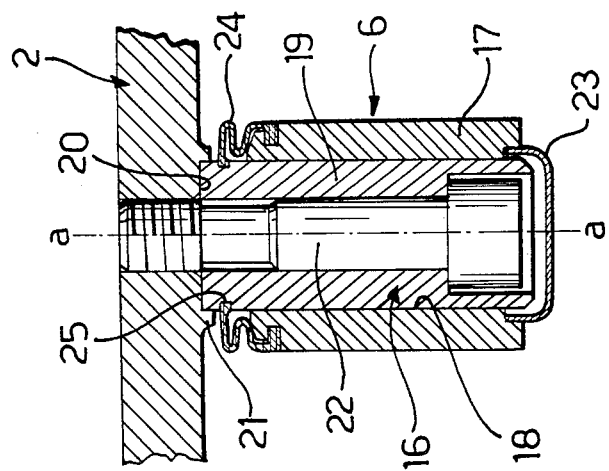
FIG. 4 is a sectional view of a detail of the disc brake assembly of FIG. 1 taken on line IV—IV.
Figure 3:
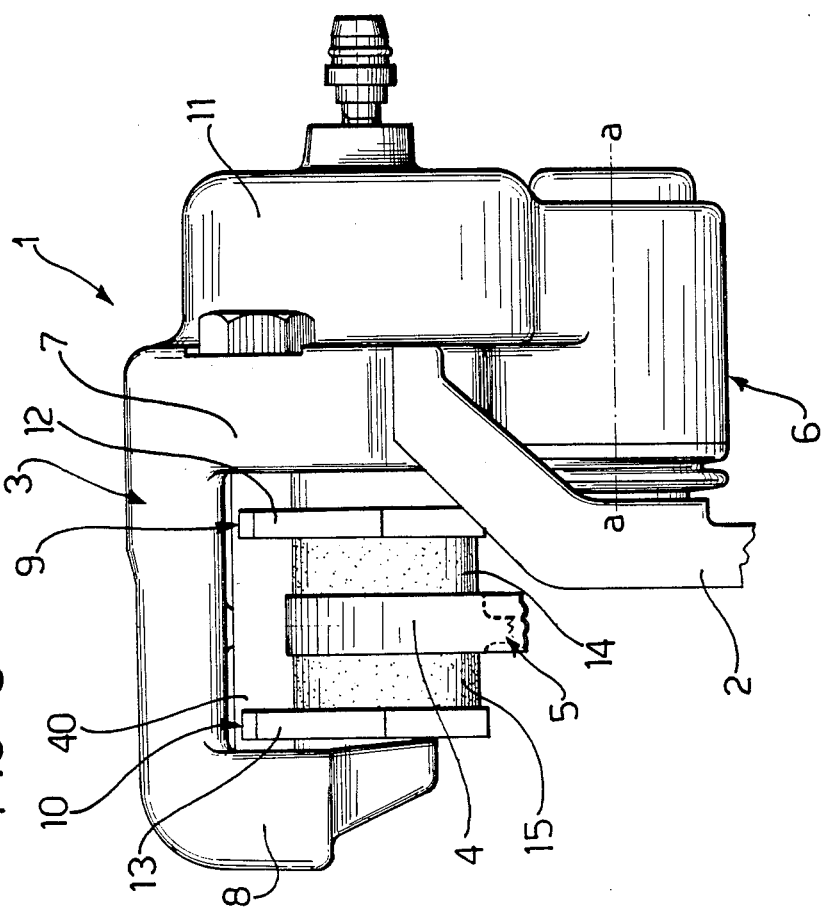
FIG. 3 is a side view of the brake assembly of FIG. 1.

With reference to the appended drawings, a disc brake assembly according to the invention is generally indicated 1 and is particularly but not exclusively intended for automobiles, motor vehicles and the like, for braking a wheel.

The disc brake assembly 1 includes a brake support 2, preferably cast from light alloy, which is preferably but not necessarily formed in one piece with a portion, not shown in the drawing, of a motor vehicle chassis or the like, also not shown.

The assembly 1 further includes a caliper body 3, preferably cast from light alloy located astride a peripheral portion 4 of a brake disc 5; the peripheral portion 4 constitutes the annular braking band of the disc 5; the disc 5 is intended to be fixed rigidly and conventionally by a portion thereof, not shown in the drawing, to a wheel of the motor vehicle or the like.

Guide means generally indicated at 6 extend in a direction parallel to the axis of the disc, which axis is indicated X—X, between the brake support 2 and the caliper body 3 to allow the caliper body 3 to slide relative to the support 2 in the direction X—X.

The caliper body 3, which extends for a predetermined distance in a direction tangential to the disc, indicated in the drawing by t—t, includes, in one piece therewith, two jaws 7 and 8 located on opposite sides of the portion 4 of the brake disc 5; the caliper body 3, in correspondence with the jaws and in a manner which will be described below, is provided with respective braking pads 9 and 10 facing the portion 4 on opposite sides thereof, the pads also extending for a predetermined distance in the direction t—t.

In correspondence with the jaw 7, the caliper body 3 has, in a conventional manner, a hydraulic cylinder generally indicated at 11 for thrusting the pad 9 against one face of the portion 4 of the disc 5 and—by reaction—the pad 10 against the opposite face of the portion 4.

More particularly, each pad 9 (10) is formed by a plate 12 (13), preferably made by blanking from steel, to which there is adhered a block 14 (15) of friction material.

The braking band 4, the pads 9 and 10 and consequently the jaws 7,8 of the caliper body extend, in a direction r—r which is radial with respect to the disc 5 and perpendicular to X—X and to t—t, by a predetermined amount, preferably a fraction of the extent of the pads in the direction t—t, for example a third.

In the disc brake assembly 1 according to the invention the guide means 6 between the caliper body 3 and the brake support 2 are located along the direction r—r in a position intermediate the axis X—X of the disc and its peripheral portion 4 constituting the braking band and includes a cylindrical pin 16, having an axis a—a extending parallel to the direction X—X and fixed to the support 2. The caliper body 3 is rotatably mounted on the pin 16. For this purpose the caliper body 3 has, in correspondence with an intermediate point along its length, an apertured lug 17 projecting towards the axis X—X of the disc 5 and provided with a cylindrical seat 18 engaging the pin 16 with limited play.

More particularly, the pin 16 is constituted by a cylindrical bush 19, preferably of steel, which is externally gauged and has one end driven into a seat 20 formed in the support by an annular centering ridge 21, the bush 19 being firmly retained in the seat 20 by a steel screw 22 extending coaxially therethrough and engaging in the support 2.

The apertured lug 17 has, in correspondence with the end of the seat 18 which corresponds to the free end of the pin 16, a stopper 23 which acts as a dust cover and, at the opposite end, an annular seal 24 extending between the lug 17 itself and an annular groove 25 formed in the pin 16. The seal 24, which also acts as a dust cover, is of the bellows type to allow the desired sliding of the apertured lug 17 relative to the pin 16 in the direction of the pin itself in accordance with the desired sliding of the entire caliper body 3 relative to the support 2 in the direction X—X of the axis of the disc.

To advantage the pin is made of such a size that its diameter is determined so as to ensure adequate strength and its length is, for example, twice its diameter, so as to ensure secure guiding of the apertured lug along the pin itself without sticking, and such as to withstand the reaction to moments in the direction r—r which develop during braking.

The disc brake assembly 1 according to the invention further includes stop means generally indicated at 26 for the caliper body 3, the stop means 26 being provided in the support 2 for retaining the caliper body itself angularly.

More particularly, the stop means 26 include two shoulders 27 and 28 formed in the support 2 at the end of respective rigid arms 29 and 30 lying in a plane parallel to the disc 5 and extending radially from the support 2 towards the ends of the caliper body 3 on opposite sides of the pin 16.

The arms 29 and 30 are disposed in the form of a fork which embraces the caliper body 3. The shoulders 27 and 28 face the caliper body 3 itself and engage respective areas 31 and 32 close to its ends.

The shoulders 27 and 28 have respective flat active surfaces 33 and 34; to advantage the planes of the active surfaces 33 and 34 pass through the axis a—a of the pin.

The caliper body 3, mounted on the support 2 so as to be rotatable about the pin 16, is retained angularly in one sense of rotation by the positive engagement of the area 31 with the shoulder 27 and in the other sense by the positive engagement of the area 32 with the shoulder 28.

The shoulders 27 and 28 located at the ends of the rigid arms 29 and 30 are so positioned so to retain the caliper body 3 angularly within an angular clearance of predetermined limited extent.

In the disc brake assembly 1 according to the invention, the pads 9 and 10 extend in the direction t—t and are supported on the caliper body 3 by a pin 35 mounted loosely with its axis parallel to the axis X—X of the caliper body 3; the pads 9 and 10 are in loose engagement with the pin 35 by means of respective slotted holes 36 and 37 in the pads 9 and 10.

Stop means generally indicated at 38 are provided for preventing the movement of the pads 9 and 10 around the pin 35. These stop means 38 include two cylindrical gudgeon pins 39 and 40 extending in a direction parallel to the axis X—X and housed in the caliper body 3 at its ends between the jaws 7 and 8 in a position immediately outside the outer peripheral edge of the braking band 4. The ends of the pads 9 and 10 are engaged with these gudgeon pins 39 and 40; for this purpose the pads 9 and 10 have respective end hooks each indicated at 41 symmetrically located relative to the slotted holes 36 and 37. Each hook 41 engages the respective gudgeon pin 39 (40) in two bearing planes 41a, 41b, one in the direction t—t and the other perpendicular thereto, both these bearing planes 41a and 41b facing the pin 35.

To advantage each gudgeon pin 39 (40) constitutes the shank of a respective bolt 42 (43) made of steel and spanning the jaws 7 and 8 to exert a predetermined gripping force across the caliper body 3. More particularly the head of each bolt 42 (43) bears against one jaw and the screw-threaded end engages in the other. The bolts 42 and 43, upon predetermined tightening, constitute a reinforcement for the caliper body 3, exerting a preloading action on the caliper body itself against the action of the braking load. This allows a drastic reduction in the size of the caliper body and hence in its weight and cost.

A small spring is indicated 44 which, bearing against the caliper body 3, urges the pads 9 and 10 constantly, through the pin 35, against the gudgeon pins 39 and 40 so as to prevent these rattling or vibrating when the brake is inoperative.

During operation at the moment of braking, the caliper body 3 locates itself on the disc 5, sliding freely along the pin 16. At the same time one of the end hooks 41 of each pad 9 and 10 comes into pressure contact with one or other of the gudgeon pins 39 and 40 according to whether the braking occurs in one or the other direction of movement of the motor vehicle. Almost simultaneously, once the angular play between the caliper body itself and the support has been taken up, the caliper body 3 comes to bear in positive pressure contact with one or the other of the shoulders 27 and 28 depending upon whether the braking occurs in one or the other direction of movement of the motor vehicle.

Once this condition is reached, the braking may continue as necessary.

By virtue of the presence of a single cylindrical pin, the sliding of the caliper body 3 relative to the support 2 in the direction of the axis of the disc is achieved securely and without jamming.

The rotation of the caliper body 3 under the tangential braking force is prevented firmly and effectively by the positive shoulders provided on the support.

In the same way the pads are firmly retained in the caliper body at the end hooks and during braking are always subject to a tractive force in the direction t—t, by the opposing actions of the tangential braking force and the reaction of the end hook respectively. Further, the pads discharge the tangential braking force on the caliper body 3 through the end hooks 41 which react against the bolts 42 and 43, the contact being between materials with a high specific strength (steel against steel) with the elimination of any local squashing.

The brake assembly according to the invention thus has an improved operation both in the first phase of the braking during which the caliper body centers itself on the disc without jamming and during the braking proper.

In addition to this, the disc brake assembly according to the invention is formed by parts which can be made with simple mechanical operations and is also simple to assemble.

The disc brake according to the invention also lends itself to being formed with the support made directly in one piece with the chassis of the motor vehicle with obvious constructional simplification. Obviously an expert in the art could make numerous modifications and variants to the disc brake assembly described above in order to satisfy specific requirements all of which, however, are within the scope of protection of the invention as defined by the following claims.

I claim:

1. Disc brake assembly of the type including a brake support, a caliper body for location astride a brake disc and provided with pads on opposite sides of the disc, said brake disc having an axis in a direction perpendicular to the disc and guide means (6) between the caliper body and brake support, extending in the direction of the axis of the disc, wherein the guide means (6) include a guide pin (16) on which the caliper body (3) is rotatably mounted, stop means (26) are provided on the support (2) for constraining angular movement of the caliper body, a pad mounting pin (35) is provided for loosely mounting the pads (9, 10) in the caliper body and wherein each said pad (9, 10) is provided with end hook portions (41) and two gudgeon pins (39, 40) are provided extending parallel to the guide pin (16) on opposite sides thereof for cooperation with the respective hook portions of each pad for retaining the pads in the caliper body against drag from braking, said gudgeon pins (39, 40) comprising the shanks of respective bolts (42, 43) spanning the caliper body (3) and exerting a predetermined gripping force thereon whereby said bolts fulfill a dual function of exerting said force on said caliper body and cooperating by their gudgeon pin shank portions with said hook portions of said pads to retain said pads in said caliper body against drag from braking.

2. Disc brake assembly as defined in claim 1, in which a spring (44) is provided mounted in said caliper body (3) in a manner urging said pads (9,10) through said pad mounting pin (35) against said gudgeon pins (38,39) to prevent rattling and vibration when no braking is being performed.

* * * * *